United States Patent Office.

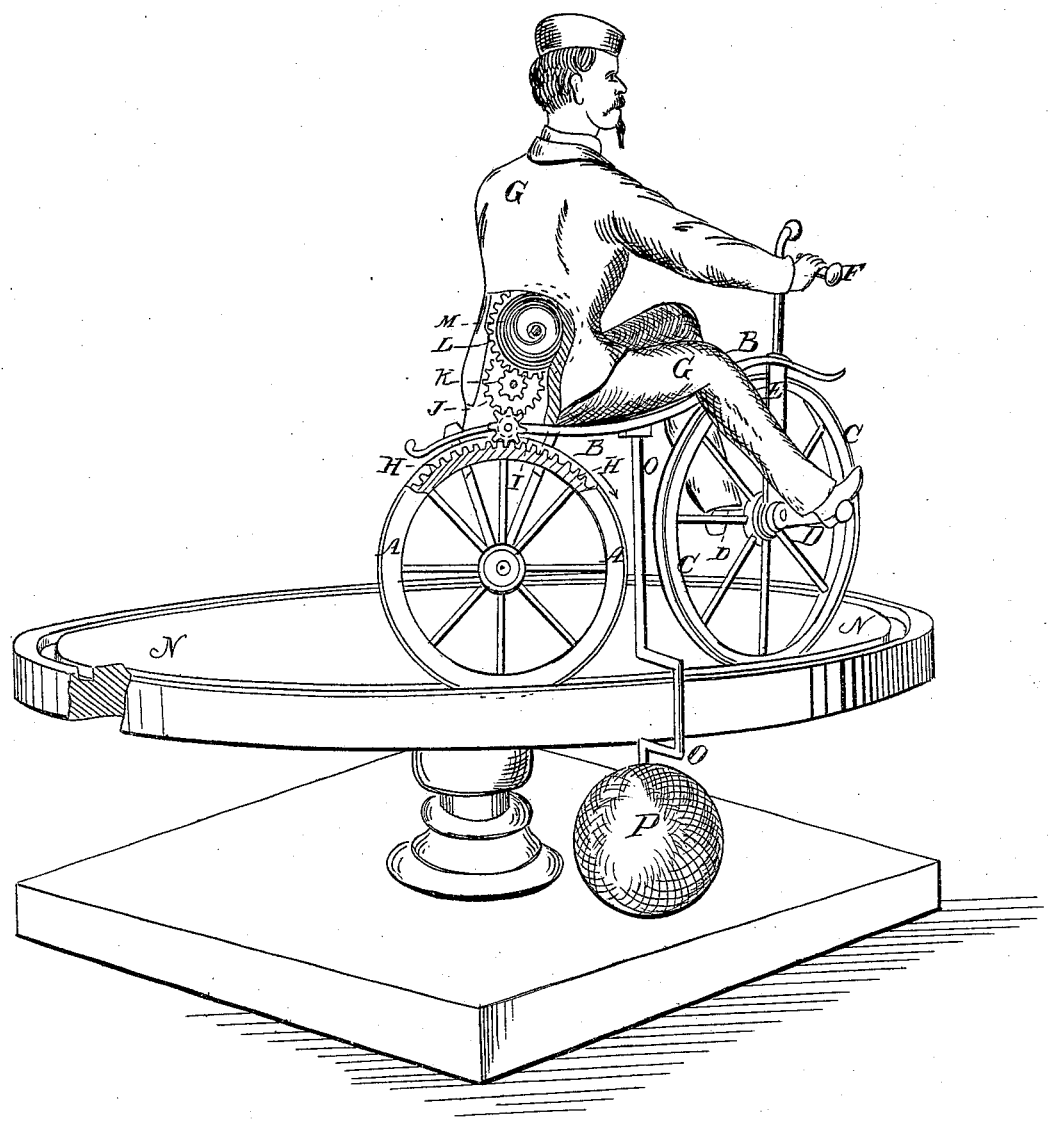

H. C. ALEXANDER, OF NEW YORK, N. Y.

Letters Patent No. 92,243, dated July 6, 1869.

---

TOY-VELOCIPEDE.

---

The Schedule referred to in these Letters Patent and making part of the same.

---

*To all whom it may concern:*

Be it known that I, H. C. ALEXANDER, of the city of New York, in the county and State of New York, have invented a new and improved Toy-Velocipede; and I do hereby declare that the following is a full, clear, and exact description thereof, which will enable others skilled in the art to make and use the same, reference being had to the accompanying drawing, forming part of this specification.

The figure is a perspective view of my improved toy-velocipede, parts being broken away to show the construction.

My invention has for its object to furnish a toy-velocipede, provided with a toy-rider, and so constructed as to operate automatically upon a circular track; and It consists in a toy-velocipede, constructed and operating as hereinafter more fully described.

The velocipede is designed to be constructed with a drive-wheel, A, reach, B, guide-wheel, C, foot-cranks, D, yoke, E, and steering-bar, F, being, in fact, a perfect velocipede in miniature.

To the reach B is attached a figure, G, made with jointed limbs, the feet of which rest upon the foot-cranks D, to which they may be loosely connected by staples or other convenient means, and the hands of which rest upon and are secured to the steering-bar F.

The face of the drive-wheel A is deeply grooved, and in the bottom of the groove are formed teeth H, as shown in the figure, the tops of which teeth should not extend quite to the face of the wheel A, so that the tread of said wheel may be left smooth.

I is a gear-wheel, the teeth of which mesh into the teeth of the larger gear-wheel J, with which is connected the pinion-wheel K. The teeth of the pinion-wheel K mesh into the teeth of the larger gear-wheel L, which is connected with its shaft by means of a pawl and ratchet, so that the said shaft may be turned to wind up the spring M, connected with said shaft, without revolving the gear-wheels, and so that the uncoiling of the spring may impart motion to the gear-wheels, and thus propel the velocipede.

The gearing or clock-work may be attached directly to the figure G, or to a frame-work interposed between and attached to the figure G and reach B, as may be desired or convenient.

N is a circular stand, upon the upper surface of which, near its outer edge, is formed a circular groove, in which the wheels A and C roll around the said stand.

O is a rod, the upper end of which screws into, or is otherwise attached to the middle part of the reach B. The rod O is formed with an offset, which passes around the edge of the stand N, as shown in the figure, so that the weight P attached to the lower end of the rod O may be directly beneath the velocipede, to balance it when upon the stand N.

It should be observed that the gearing may have a balance-wheel connected with it, to regulate the motion.

Having thus described my invention,

What I claim as new, and desire to secure by Letters Patent, is—

An improved toy-velocipede, constructed and operating substantially as herein shown and described.

H. C. ALEXANDER.

Witnesses:
WM. P. CONVERSE,
A. C. HENSLEY.